Mickey & Leathery,
Corn Planter.

No. 93,327.          Patented Aug. 3, 1869.

Witnesses.
Jerry King
J. H. Lehmann

Inventor.
Solomon Mickley
Saml. Leathery
per
Alexander Riaton
Attys.

United States Patent Office.

SOLOMON MICKLEY, OF DOVER TOWNSHIP, AND SAMUEL LEATHERY, OF WARRINGTON TOWNSHIP, PENNSYLVANIA.

Letters Patent No. 93,327, dated August 3, 1869.

IMPROVEMENT IN SEED-DRILLS.

The Schedule referred to in these Letters Patent and making part of the same.

*To all whom it may concern:*

Be it known that we, SOLOMON MICKLEY, of Dover township, and SAMUEL LEATHERY, of Warrington township, in the county of York, and in the State of Pennsylvania, have invented certain new and useful Improvements in Seed-Drills; and do hereby declare that the following is a full, clear, and exact description thereof, reference being had to the accompanying drawings, and to the letters of reference marked thereon, making a part of this specification.

The nature of our invention consists in the construction of a seed-drill, and in the arrangement of the devices hereafter set forth and explained.

Figure 1:
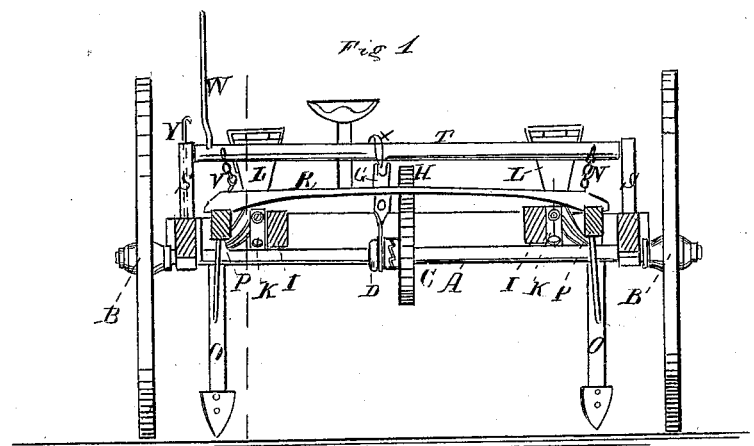
Figure 1 is a front elevation of our drill, part of the frame being removed.
Figure 2:
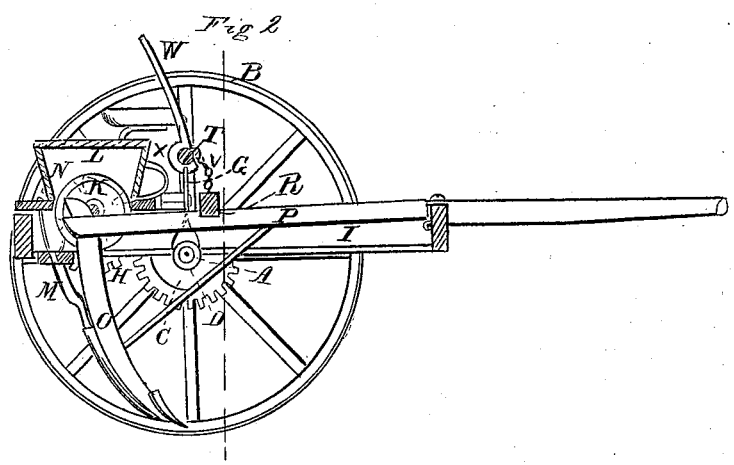
Figure 2 is a section view of the same.
Figure 3:
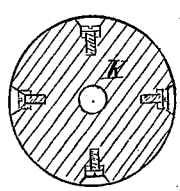
Figure 3 is a section of the drum.

Letter A represents the axle, upon which the frame rests, and which is supported by the driving-wheels B.

Near the centre of this axle there is placed the spur-wheel C, provided with a short toothed sleeve on one side, and which turns independently of the axle.

By the side of this wheel is placed the collar D, which slides back and forth on the axle, so as to throw the spur in and out of gear.

Upon one end of this collar there are notches cut, so as to engage with those on the side of the wheel, and it has a groove cut in its surface, in which the lower end of the lever G catches, so as to move it back and forth.

Upon the top of the two beams I, which form a part of the frame, is placed a shaft, to which are secured the wheel H, near its centre, and a drum, K, at each end.

The upper portions of these drums are covered by the seed-boxes L, in which are placed the brushes N, so as to sweep the grains from the top of the drums, and prevent them from getting between the side of the boxes and the drums.

In the surface of the drums there is a number of openings made, in which there is sunk a screw, which can be raised or lowered, so as to regulate the number of grains to a hill.

As the grains fall from the drums, they are caught in the spouts M, and conveyed by the boots, secured to the back of the plows O, into the furrows.

Pivoted to the front end of the frame there are two beams, P, joined together by the cross-pieces R, which extend backward, and have the plows O attached to their rear ends.

Extending upward from the frame, on each side, there is a standard, S, which serves as a bearing for the shaft T, which is connected to the plows by the chains V, for the purpose of raising and lowering them.

Near the centre of this shaft there is placed a spiral gear, X, which catches in a slot in the top of the lever G, so that when the bar is turned backward, by means of the hand-lever W, the plows are raised, and the wheel C thrown out of gear at the same time.

Rising upward from the side of the frame is the rod Y, bent at its top, so as to catch the hand-lever, and keep the plows raised above the ground.

Having thus described our invention,

What we claim as our invention, and desire to secure by Letters Patent, is—

1. The shaft T, provided with the spiral gear X, and chains V, and lever W, when used to raise the plows, and throw the wheel C out of gear by the same motion, substantially as set forth and described.

2. The slotted lever G, operated by the spiral gear X, in combination with the movable collar D, wheels C and H, drums K, brushes N, and seed-boxes L, when used substantially as specified.

3. The axle A, wheels C and H, movable collar D, lever G, drums K, brushes N, seed-boxes L, shaft T, provided with spiral gear X, hand-lever W, chains N, and plows O, when used and combined substantially as described.

In testimony that we claim the foregoing, we have hereunto set our hands, this 7th day of June, 1869.

SOLOMON MICKLEY.
SAMUEL LEATHERY.

Witnesses:
F. K. LEHMANN,
J. M. MASON.